(12) United States Patent
Nakamura et al.

(10) Patent No.: US 11,507,176 B2
(45) Date of Patent: Nov. 22, 2022

(54) INFORMATION PROCESSING APPARATUS AND CONTROL METHOD

(71) Applicant: Lenovo (Singapore) Pte. Ltd., Singapore (SG)

(72) Inventors: Atsunobu Nakamura, Kanagawa (JP); Tsutomu Chonan, Kanagawa (JP); Takuroh Kamimura, Kanagawa (JP); Masahiro Kitamura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/383,002

(22) Filed: Jul. 22, 2021

(65) Prior Publication Data

US 2022/0091660 A1 Mar. 24, 2022

(30) Foreign Application Priority Data

Sep. 24, 2020 (JP) .............................. JP2020-159552

(51) Int. Cl.
*G06F 1/26* (2006.01)
*G06F 1/32* (2019.01)
*G06F 1/3287* (2019.01)
*G06F 1/3206* (2019.01)
*G06F 1/20* (2006.01)

(52) U.S. Cl.
CPC ............ *G06F 1/3287* (2013.01); *G06F 1/206* (2013.01); *G06F 1/3206* (2013.01)

(58) Field of Classification Search
CPC ...... G06F 1/206; G06F 1/3287; G06F 1/3206; G06F 1/3215; G06F 1/324; G06F 1/3296; G06F 1/203; Y02D 10/00
See application file for complete search history.

(56) References Cited

U.S. PATENT DOCUMENTS 8,713,341 B2 * 4/2014 Utah .................. H04N 1/00904
713/320
2006/0143484 A1 * 6/2006 Samson ................ G06F 1/3237
713/320

FOREIGN PATENT DOCUMENTS

| JP | 2006-048175 A | 2/2006 |
| JP | 2014-523023 A | 9/2014 |
| JP | 2015-215757 A | 12/2015 |
| JP | 2017041007 A | 2/2017 |

* cited by examiner

*Primary Examiner* — Nitin C Patel
(74) *Attorney, Agent, or Firm* — Osha Bergman Watanabe & Burton LLP

(57) ABSTRACT

An information processing apparatus includes a first processor that takes plural stages of first power control modes different in first rated power from one another, a second processor that takes plural stages of second power control modes different in second rated power from one another, and a power control unit controls the power consumption of the first processor and the power consumption of the second processor. The power control unit determines a second power control mode based on a first event in which a predetermined state of the first processor continues for a first duration or more, and a second event in which a predetermined state of the second processor continues for a second duration or more.

10 Claims, 6 Drawing Sheets

| POWER CONTROL MODE | | LOW NOISE (Q) | BALANCE (B) | HIGH PERFORMANCE (P) |
|---|---|---|---|---|
| TARGET TEMPERATURE[°C] | | TEM1 | TEM2 | TEM3 |
| NOISE UPPER LIMIT [dB SPL] | | SND1 | SND2 | SND3 |
| SET POWER[W] | PL112 | P0112 | P0112 | P0112 |
| | PL132 | P0132 | P0132 | P0132 |
| | PL111 UPPER LIMIT | P0111qu | P0111bu | P0111pu |
| | PL131 UPPER LIMIT | P0131qu | P0131bu | P0131pu |
| | PL111 LOWER LIMIT | P0111ql | P0111bl | P0111pl |
| | PL131 LOWER LIMIT | P0131ql | P0131bl | P0131pl |

FIG. 5

| POWER CONTROL MODE | STATE | DURATION |
|---|---|---|
| CPU: HIGH PERFORMANCE(P) | CPU Power ≥ SP113 | T113 |
| GPU: HIGH PERFORMANCE(P) | GPU Power = ON | T313 |
| CPU: BALANCE(B) | CPU Power ≥ SP112 | T112 |
| GPU: BALANCE(B) | GPU Power = ON | T312 |
| CPU: LOW NOISE(Q) | CPU Power ≤ SP121 | T121 |
| GPU: LOW NOISE(Q) | GPU Power = OFF | T321 |
| CPU: BALANCE(B) | CPU Power ≤ SP122 | T122 |
| GPU: BALANCE(B) | GPU Power = OFF | T322 |

FIG. 6

| POWER CONTROL MODE | STATE | DURATION |
|---|---|---|
| CPU: HIGH PERFORMANCE(P) | CPU Power ≥ SP113 | T113 |
| GPU: HIGH PERFORMANCE(P) | GPU Temp ≥ TP313 | T313 |
| CPU: BALANCE(B) | CPU Power ≥ SP112 | T112 |
| GPU: BALANCE(B) | GPU Temp ≥ TP312 | T312 |
| CPU: LOW NOISE(Q) | CPU Power ≤ SP121 | T121 |
| GPU: LOW NOISE(Q) | GPU Temp ≤ TP321 | T321 |
| CPU: BALANCE(B) | CPU Power ≤ SP122 | T122 |
| GPU: BALANCE(B) | GPU Temp ≤ TP322 | T322 |

| POWER CONTROL MODE | STATE | DURATION |
|---|---|---|
| CPU: HIGH PERFORMANCE(P) | CPU Power ≥ SP113 | T113 |
| GPU: HIGH PERFORMANCE(P) | GPU Power = ON | T313 |
| CPU: BALANCE(B) | CPU Power ≥ SP112 | T112 |
| GPU: BALANCE(B) | GPU Power = ON | T312 |
| CPU: LOW NOISE(Q) | CPU Power ≤ SP121 | T121 |
| GPU: LOW NOISE(Q) | GPU Power = OFF | T321 |
| CPU: BALANCE(B) | CPU Power ≤ SP122 | T122 |
| GPU: BALANCE(B) | GPU Power = OFF | T322 |

INFORMATION PROCESSING APPARATUS AND CONTROL METHOD

CROSS-REFERENCE TO RELATED APPLICATIONS

This application claims priority to Japanese Patent Application No. 2020-159552 filed Sep. 24, 2020, the contents of which are hereby incorporated herein by reference in their entirety.

BACKGROUND

Technical Field

The present invention relates to a technique for controlling the power consumption of an information processing apparatus.

Related Art

An information processing apparatus such as a personal computer (PC) has an image processing function to display various screens. Such an image processing function is also called a graphics function or a drawing function, and made to be speeded up or be multifunctional depending on the application requested with the times. For example, 3D display in games or computer graphics, and real-time display to be applied to VR (Virtual Reality) or AR (Augmented Reality) have been becoming popular in recent years.

An information processing apparatus may include a processor separate from a CPU (Central Processing Unit) for performing arithmetic processing and control to make the processor carry the image processing function. As the processor dedicated to the image processing function, a GPU (Graphics Processing Unit) may be used. The GPU may be incorporated in the CPU, or may be included as an element separate from the CPU. Typically, an advanced image processing function is provided in the latter case.

In the information processing apparatus including the GPU separate from the CPU, the introduction of switchable graphics (SWG) has been proposed. The SWG is a function to make it switchable between an image processing function incorporated in the CPU and an image processing function carried by the GPU separate from the CPU. Therefore, full image processing functionality and reduced power consumption are selectable.

For example, an information processing device disclosed in Japanese Unexamined Patent Application Publication No. 2017-41007, which can operate in a plurality of power consumption states and includes state management means that manages the power consumption state of the information processing device, includes a CPU for providing image display for user input, a graphic accelerator capable of performing drawing processing faster than the CPU, and a memory control unit shared by the CPU and the graphic accelerator to store data for providing image display. In the case of a power-saving mode, the CPU is used as a drawing device, while in the case of a normal mode, the graphic accelerator is used as the drawing device.

However, even when power consumption is reduced in the CPU, full image processing functionality may be required temporarily. Therefore, if the power control mode of the GPU is determined simply according to the power control mode of the CPU, the required image processing functionality may not be able to be demonstrated.

In an example illustrated in FIG. 10, when the CPU operates in a low noise mode, the GPU also operates in the low noise mode. In this case, the processing speed may be slower than a processing speed expected as the processing speed of a CAD (Computer Aided Design) application accompanied with relatively many image processing.

SUMMARY

One or more embodiments provide an information processing apparatus that includes: a first processor which can take plural stages of first power control modes different in first rated power from one another; a second processor which can take plural stages of second power control modes different in second rated power from one another; and a power control unit which controls the power consumption of the first processor and the power consumption of the second processor, wherein the power control unit determines a second power control mode based on a first event in which a predetermined state of the first processor continues for a first duration or more, and a second event in which a predetermined state of the second processor continues for a second duration or more.

In the above information processing apparatus, the power control unit may also determine a second power control mode higher in second rated power as the second duration to continue an operating state in which the second processor operates as the predetermined state of the second processor is longer.

In the above information processing apparatus, the power control unit may further determine a second power control mode lower in second rated power as the second duration to continue a stopped state in which the second processor is stopped as the predetermined state of the second processor is longer.

Further, in the above information processing apparatus, the power control unit may determine a second power control mode higher in second rated power as the temperature of the second processor as the predetermined state of the second processor is higher.

Further, in the above information processing apparatus, the power control unit may determine a second power control mode lower in second rated power as the temperature of the second processor as the predetermined state of the second processor is lower.

Further, in the above information processing apparatus, the power control unit may give priority to transition to a second power control mode with the highest rated power among transition destinations according to transition conditions as transition conditions to second power control modes higher in rated power that the state of the second processor satisfies.

Further, in the above information processing apparatus, the power control unit may give priority to transition to a second power control mode with the lowest rated power among transition destinations according to transition conditions as transition conditions to second power control modes lower in rated power that the state of the second processor satisfies.

Further, in the above information processing apparatus, the power control unit may give priority to transition to a transition destination according to a transition condition to a second power control mode higher in rated power over transition to a transition destination according to a transition condition to a second power control mode lower in rated power among the transition conditions that the state of the second processor satisfies.

The above information processing apparatus may further include a temperature control unit which controls the temperature of the own apparatus, wherein the temperature control unit expands an output range of a fan of the own apparatus as the first rated power of a first power control mode is higher or as the second rated power of a second power control mode is higher.

A control method according to one or more embodiments is a control method of an information processing apparatus configured to include: a first processor which can take plural stages of first power control modes different in first rated power from one another; and a second processor which can take plural stages of second power control modes different in second rated power from one another, the control method including a step of causing the information processing apparatus to determine a second power control mode based on a first event in which a predetermined state of the first processor continues for a first duration or more, and a second event in which a predetermined state of the second processor continues for a second duration or more.

The above-described embodiments can demonstrate an image processing function required by a user regardless of the main power control mode.

BRIEF DESCRIPTION OF THE DRAWINGS

FIG. 5 is a diagram illustrating an example of a power control table according to one or more embodiments.

FIG. 6 is a diagram illustrating an example of a mode transition table according to one or more embodiments.

DETAILED DESCRIPTION

Embodiments of the present invention will be described below with reference to the accompanying drawings. First, the outline of an information processing apparatus 1 according to one or more embodiments will be described. In the following description, a case in which the information processing apparatus 1 is a laptop PC is taken mainly as an example. However, the information processing apparatus 1 is not necessarily limited to the laptop PC, and the information processing apparatus 1 may also be a desktop PC, a tablet terminal device, a smartphone, or the like. Further, in the information processing apparatus 1, either or both of an ODD (Optical Disk Drive) 17 and an HDD (Hard Disk Drive) 19 may be omitted.

Figure 1:
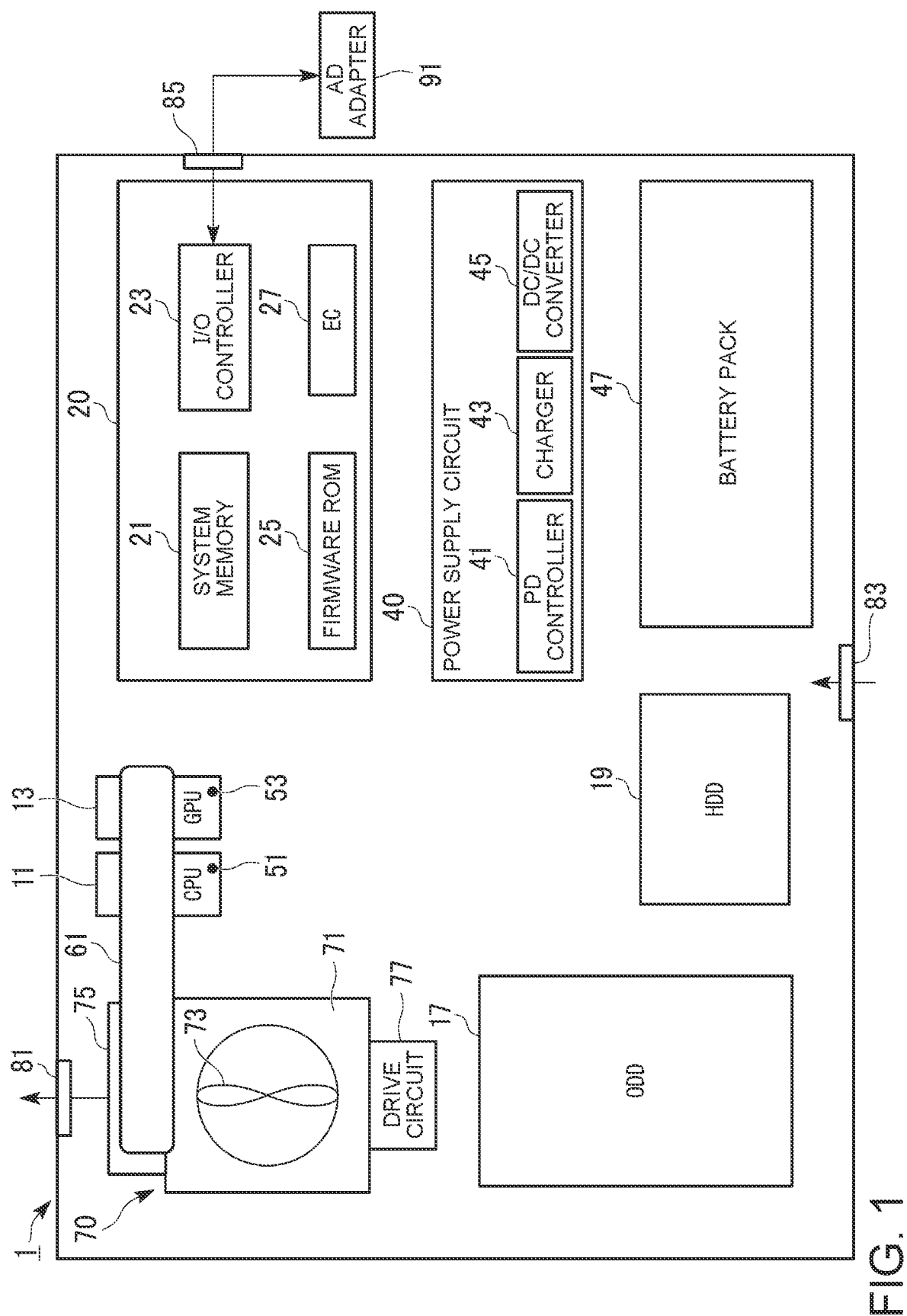
FIG. 1 is a plan view illustrating a hardware configuration example of an information processing apparatus according to one or more embodiments.

FIG. 1 is a plan view illustrating a hardware configuration example of the information processing apparatus 1 according to one or more embodiments.

The information processing apparatus 1 is configured to include a heat dissipation unit 70, a CPU 11, a GPU 13, the ODD 17, the HDD 19, a circuit board 20, a power supply circuit 40, and a battery pack 47, and each of these units is arranged inside a chassis.

On the circuit board 20, a system memory 21, an I/O (Input/output) controller 23, a firmware ROM (Read Only Memory) 25, and an EC (Embedded Controller) 27 are placed.

The system memory 21 is a storage medium used as reading areas of execution programs of the CPU 11 or working areas to which processing data of the execution programs of the CPU 11 are written. The system memory 21 may also be called a main storage device or a main memory. For example, the system memory 21 is configured to include one or more DRAM (Dynamic Random Access Memory) chips. The execution programs include an OS (Operating System), various drivers for operating peripheral devices, application programs (hereinafter called apps) for executing specific processing, and the like.

The system memory 21 may also be shared with any other device, rather than used by the CPU 11 (UMA: Unified Memory Architecture). For example, a common area may be provided in part of the storage area of the system memory 21. In the common area, for example, access from the GPU 13 as any device other than the CPU 11 is allowed. By providing the common area, no data transfer between devices such as between the CPU 11 and the GPU 13 is required. Further, an area as a reading area of an execution program dedicated to the GPU 13 or a working area to which processing data of the execution program dedicated to the GPU 13 is written may also be provided in any other part of the storage area of the system memory 21 separately from the common area.

The I/O controller 23 is connected to a data bus to control input/output between respective components of the information processing apparatus 1 and from/to external devices. The I/O controller 23 is configured to include I/O interfaces, such as SATA (Serial Advanced Technology Attachment), USB (Universal Serial Bus), PCI (Peripheral Component Interconnect) Express, and LPC (Low Pin Count), and a RTC (Real Time Clock).

For example, the I/O controller 23 includes a USB interface compliant with the USB 3.2 standard (also called USB Type-C). The USB interface makes it connectable to an external device (for example, an AD (Alternating current-Direct current conversion) adapter 91) by USB to be able to receive the supply of power from the connected external device. In other words, the USB interface can not only perform data input/output with the external device through a signal line of the USB, but also can receive the supply of power through a power line of the USB.

In the firmware ROM 25, various system firmware such as an I/O module and an authentication module is prestored. For example, the I/O module includes a BIOS (Basic Input/output System). When the supply of power is started, the CPU 11 reads the system firmware. The CPU 11 executes processing instructed by a command written in the system firmware. In the following description, the expression that "executes processing instructed by a command written in a program (in addition to the system firmware, an app or an OS can be regarded as the program)" may also be called "executes a program." Further, in this application, the fact that hardware including a processor such as the CPU 11 or the GPU 13 performs processing instructed by a command written in a program may also be expressed as "the program performs the processing." For example, the CPU 11 controls input/output of a system device (to be described later) by executing processing instructed by a command written in the BIOS. This may also be expressed as the "BIOS controls input/output of the system device."

The EC 27 is a microcomputer configured to include hardware, such as a CPU, a ROM, and a RAM (Random Access Memory), separate from processors such as the CPU 11 and the GPU 13. The EC 27 controls the operation of the power supply circuit 40 according to the operating state of a main system 100 (to be described later) to control the supply of power to each of devices that constitute the information processing apparatus 1. In one or more embodiments, the EC 27 controls an input voltage of power to be supplied from the AD adapter 91 to a DC/DC converter of the power supply circuit 40 according to the operating state of the main system 100. The system device means a device that constitutes part of the main system 100, which does not include a device that constitutes part of the EC 27 or a power supply system 300.

The power supply circuit 40 is configured to include a PD (Power Delivery) controller 41, a charger 43, and the DC (Direct Current)/DC converter 45.

The PD controller 41 controls power to be supplied from the AD adapter 91 to the DC/DC converter 45.

The charger 43 controls charging of power supplied from the AD adapter 91 to the battery pack 47. Note that the power supplied from the AD adapter 91 is supplied to the DC/DC converter 45. Out of the supplied power, power remaining without being consumed is charged to the battery pack 47.

The DC/DC converter 45 is a voltage converter which converts the input voltage of DC power supplied from the AD adapter 91, and supplies power of a predetermined voltage obtained by converting the input voltage to each device of the information processing apparatus 1.

The battery pack 47 charges power remaining without being consumed out of the power supplied from the charger 43. For example, the battery pack 47 is configured to include a lithium ion battery. When no power is supplied from the AD adapter 91, the battery pack 47 discharges the charged power and supplies the discharged power to the DC/DC converter 45. The battery pack 47 may be fixedly attached to the information processing apparatus 1, or may be detachable.

The AD adapter 91 has one end electrically connected to an outlet of the commercial power supply, and the other end electrically connected via a connector 85 of the information processing apparatus 1.

The AD adapter 91 converts AC power supplied from the commercial power supply into DC power. The AD adapter 91 supplies the converted DC power to the DC/DC converter 45 and the charger 43 via the connector 85.

In the example illustrated in FIG. 1, the AD adapter 91 is separate from the information processing apparatus 1, but one or more embodiments of the present invention is not limited to this example. The AD adapter 91 may be incorporated and integrated into the chassis of the information processing apparatus 1.

The heat dissipation unit 70 is configured to include a cooling fan 73, a heatsink 75, and a drive circuit 77. The cooling fan 73 is housed in a thin fan chamber 71. The cooling fan 73 is a centrifugal cooling fan having a rotating shaft, a fan motor that rotates the rotating shaft, and plural blades. Each of the plural blades is attached to the rotating shaft, respectively. The heatsink 75 exchanges heat with outside air to exhaust the heat conducted in the own unit to the outside air. The heatsink 75 is placed in a position in which a side opening of the fan chamber 71 is in contact with an exhaust port 81 of the chassis. When the cooling fan 73 is rotated, outside air flows from an air intake port 83 into a suction port of the fan chamber 71, passes through plural fins formed in the heatsink 75 while absorbing heat radiated from the fins, and is exhausted from the exhaust port 81.

A heat pipe 61 is placed in contact with the heatsink 75 in a manner to be thermally bonded to a heat-receiving plate of the CPU 11 and the GPU 13.

In the information processing apparatus 1, temperature sensors 51 and 53 are installed. Each of the temperature sensors 51 and 53 detects the temperature of the own unit, and outputs temperature data indicative of the detected temperature to the EC 27, respectively. In the example illustrated in FIG. 1, the temperature sensors 51 and 53 are placed in positions in contact with or in proximity to the surfaces of the CPU 11 and the GPU 13, respectively. In addition, plural other temperature sensors may also be installed for devices the temperature control of which is required, areas to be frequently contacted by a human body, and other members in such a manner that respectively detected temperatures are used for temperature control.

The CPU 11 executes various arithmetic processing by program control to control the overall operation of the information processing apparatus 1.

The GPU 13 executes image processing under the control of the CPU 11 to generate display data. The GPU 13 outputs the generated display data to a display unit (not illustrated). The display unit displays a display screen based on the display data input from the GPU 13. The display unit is, for example, a liquid crystal display.

The GPU 13 is provided separately from the CPU 11. The GPU 13 provided separately from the CPU 11 is also called a dGPU (discrete GPU), an eGPU (external GPU), or a separate GPU. The GPU 13 generally works faster than an iGPU (internal GPU or incorporated GPU) incorporated in the CPU 11. Further, the CPU 11 may control the presence or absence of the operation of the GPU 13 according to the load on the own unit. The power consumption can be reduced by stopping the operation of the GPU 13. Further, for example, in a case where the CPU 11 includes an iGPU, the CPU 11 may stop the operation of the GPU 13 while making the iGPU work when the image processing load is less than a predetermined load, or stop the operation of the iGPU by starting the operation of the GPU 13 when the image processing load is equal to or more than the predetermined load. This achieves the advantages of both the iGPU and the dGPU. The CPU 11 and the GPU 13 are connected to the data bus to enable input/output of various data mutually.

Note that the CPU 11 and the GPU 13 are not limited to one each, and either or both of the CPU 11 and the GPU 13 may be two or more in number.

Although power of a constant voltage is supplied to the CPU 11 and the GPU 13 from the DC/DC converter 45, respectively, power consumption is generally variable. Each of the CPU 11 and the GPU 13 may make either or both of the operating voltage and the operating frequency variable depending on the power consumption, respectively. For example, the CPU 11 executes the system firmware to set, in a register included in each of the CPU 11 and the GPU 13, the maximum operating frequency allowed according to the operating state (operating mode) of the main system 100 or the power control mode. When the operating frequency at the time is higher than the set maximum operating frequency, the CPU 11, GPU 13 changes the operating frequency step by step to make the operating frequency equal to or less than the set maximum operating frequency, respectively. When lowering the operating frequency, the CPU 11, GPU 13 may lower the operating voltage up to a value required for the operation of the own unit with the operating frequency, respectively (speed step). Thus, the power consumption of the CPU 11, GPU 13 is reduced. In other words, the CPU 11, GPU 13 can increase the allowed maximum power consumption by increasing either of the operating voltage and the operating frequency (for example, the operating frequency), or both of them.

Further, the CPU 11, GPU 13 may perform intermittent operation in which the start and stop of the operation is repeated at regular intervals to make the average processing speed variable (throttling). The system firmware may make throttling setting information indicative of the validity of throttling and a duty ratio (throttling rate) settable in the register of each of the CPU 11 and GPU 13, respectively. The processing power of the CPU 11, GPU 13 can be changed step by step depending also on the throttling. This change in processing power leads to a change in power consumption, and hence a change in the amount of heat generation.

The CPU 11, GPU 13 may use both the speed step and the throttling in such a manner as to execute the throttling while keeping the lowest operating frequency by the speed step. In other words, the CPU 11, GPU 13 can set the maximum power consumption allowed according to the determined operating frequency.

The CPU 11, GPU 13 performs throttling to change the processing power of the own unit to any one of plural stages. The CPU 11, GPU 13 can increase power consumption as the throttling rate increases.

In the following description, the processing power of the CPU 11, GPU 13 or the stage thereof, which can be set variable by either or both of the speed step and the throttling, is called "performance step." It is meant that the larger the value of the performance step is, the higher the processing power. Then, the higher the processing power, the higher the power consumption. For example, 100% of the value of the performance step means an operating state in which the processing power is maximized without being reduced.

Each of the CPU 11 and the GPU 13 may also include a TCC (Thermal Control Circuit), respectively. For example, the TCC included in the GPU 13 monitors temperature detected by the temperature sensor 53 to control the operation of the GPU 13 in such a manner that, when the load increases to cause the detected temperature to rise higher than a predetermined reference temperature, the operating frequency and the operating voltage are lowered or intermittent operation is performed to suppress the temperature rise. The TCC included in the CPU 11 also controls the operation of the CPU 11 based on the temperature detected by the temperature sensor 51 in the same manner as the TCC included in the GPU 13.

Since each of the CPU 11 and the GPU 13 is generally high in performance step and the power consumption thereof increases as the usage rate increases, the amount of heat generation increases. By setting performance step corresponding to power consumption equal to or less than the allowed maximum power consumption, each of the CPU 11 and the GPU 13 operates in such a manner that the power consumption becomes equal to or less than the set maximum power consumption. Therefore, the more the performance step is reduced, the longer the execution time of the process becomes, and hence the power consumption is reduced. Heat generated by either or both of the CPU 11 and the GPU 13 not only raises the temperature of the own unit, but also raises temperatures inside and outside of the chassis. However, the lower the power consumption, the smaller the amount of heat generation. Therefore, when the power consumption is low, the stop of a heat dissipation mechanism such as the cooling fan 73 or lowering of output is allowed. In other words, when the power consumption is high, the operation of the cooling fan 73 or increased output is required.

The GPU 13 operates under the control of the CPU 11, but the usage rate of the GPU 13 does not always have correlation with the usage rate of the CPU 11 in general. Therefore, when the usage rate of either one of the CPU 11 and the GPU 13 becomes high, there can be a case where heat dissipation is promoted by starting the operation of the heat dissipation mechanism or increasing output. In this case, the generation of heat by increasing the other usage rate may be allowed. Conversely, when the heat dissipation mechanism is stopped or output drops due to the fact that the usage rate of either one of the CPU 11 and the GPU 13 becomes low, heat dissipation is suppressed. Therefore, since maintaining or increasing the other usage rate is not allowed, there may be a need to reduce the usage rate.

Figure 2:
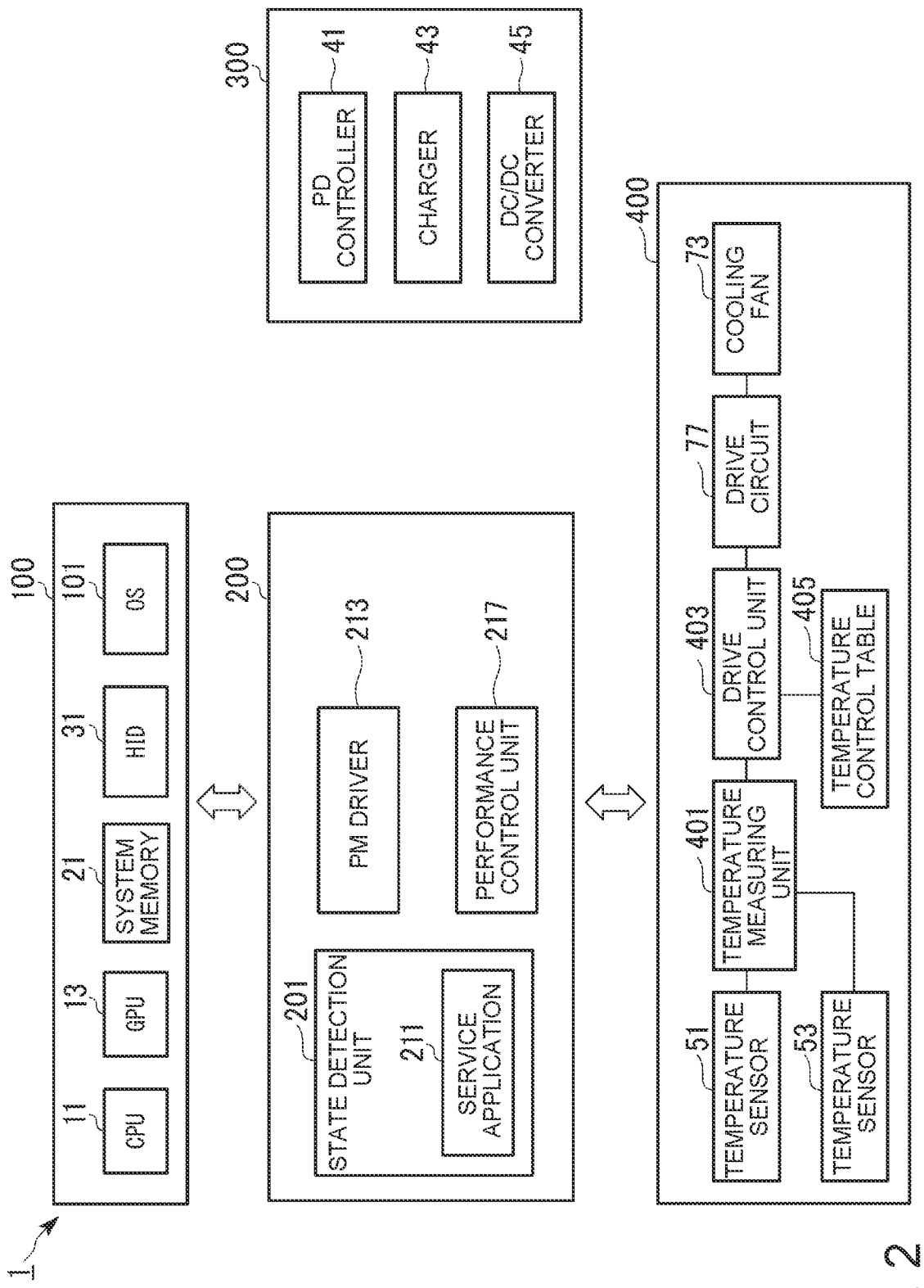
FIG. 2 is a block diagram illustrating a functional configuration example of the information processing apparatus according to one or more embodiments.

Next, the functional configuration of the information processing apparatus 1 according to one or more embodiments will be described. FIG. 2 is a block diagram illustrating a functional configuration example of the information processing apparatus 1 according to one or more embodiments.

The information processing apparatus 1 includes the main system 100, a performance control system 200, the power supply system 300, and a temperature control system 400.

The main system 100 is a computer system configured to include hardware, such as the CPU 11, the GPU 13, the system memory 21, and an HID (Human Interface Device) 31, and software such as an OS 101 and a schedule task.

The CPU 11 executes the OS 101 and other software to demonstrate functions instructed by the software in collaboration with hardware such as the GPU 13, the system memory 21, the HID 31, and the like.

The GPU 13 executes image processing according to a predetermined image processing program in response to a control signal provided from the CPU 11.

The HID 31 is configured to include input devices physically accessed with user's operations to make entries, such as a keyboard, a mouse, and a touch screen, and output devices for presenting information to the user such as a display and a speaker.

The OS 101 is executed to provide basic functions. The basic functions include, for example, control of the execution state of an app or any other program, providing of a standard interface during the execution of the program, the management of various resources of the main system 100 and the other hardware connected to the main system 100 directly or indirectly, and the like.

Next, a configuration example of the performance control system 200 will be described. The performance control system 200 is configured to include a state detection unit 201, a PM (Power Management) driver 213, and a performance control unit 217. The state detection unit 201 cooperates with a service application 211 executed by the CPU 11 on the OS 101 and an intermediate driver built in the kernel of the OS 101 to demonstrate its function in order to acquire the states of processors including the CPU 11. The intermediate driver monitors processes generated in the CPU 11 by the operation of the OS 101.

The service application 211 is a state monitoring program executed by the CPU 11 to mainly monitor the state of the CPU 11, which provides part of the functionality of the state detection unit 201. For example, the service application 211 acquires, from the OS 101, information on the power consumption of the CPU 11.

The service application 211 may acquire parameters such as the average usage rate of the CPU 11 during a predetermined monitoring time to that point, the presence or absence of user activity, and the disk access time to identify the operating state using the acquired parameters. For example, the service application 211 may recognize the start and end of the execution of a task such as an application program based on the usage rate of the CPU 11, the power consumption parameter, and the like.

The service application 211 may also detect the state of any other processor such as the GPU 13. For example, the state detection unit 201 may acquire, as the state of the GPU 13, information indicative of the operating state (ON) or the stopped state (OFF) output from the GPU 13, or may acquire temperature data output from the temperature sensor 53 via a temperature measuring unit 401 (to be described later).

The service application 211 outputs, to the PM driver 213, processor state information indicative of the detected state of the processor such as the CPU 11 or the GPU 13.

The PM driver 213 extracts a parameter indicative of the state of each individual processor related to power consumption from various parameters that constitute the processor state information input from the service application 211. The PM driver 213 outputs the processor state information including the extracted parameter to the performance control unit 217 and the PD controller 41.

The performance control unit 217 controls the processing power of each of the CPU 11 and the GPU 13 based on the processor state information input from the PM driver 213 or processor state information set by a user interface 205, respectively. For example, the performance control unit 217 constitutes some of the functions obtained by the CPU 11 executing the system firmware.

Note that maximum power consumption as a parameter related to control of the processing power of each processor includes a first power limit (hereinafter PL1) and a second power limit (hereinafter PL2), respectively. PL1 corresponds to rated power. The PL1 is a threshold value for allowing power consumption to temporarily exceed this value but restricting the power consumption not to exceed this value continuously for a predetermined time. The PL1 is also called a long-term power limit. The PL2 is a threshold value for restricting the power consumption not to exceed this value even when the power consumption is temporary. The PL2 is also called a short-term power limit. The PL2 corresponds to the upper limit of the power consumption of the processor when the performance step is 100%. The PL1 and the PL2 are set for individual processors, that is, for the CPU 11 and the GPU 13, respectively. In the following description, PL1 and PL2 for the CPU 11 may be called PL111 and PL112, and PL1 and PL2 for the GPU 13 may be called PL131 and PL132 to distinguish therebetween, respectively.

When a period of time during which the power consumption of each processor exceeds PL1 continues a predetermined duration T (for example, 0.2 to 1 [s]) or more, the performance control unit 217 reduces the performance step set in the register of the processor at the time until the moving average value of the power consumption becomes PL1 or less. Further, the performance control unit 217 increases the performance step set in the register of the processor at the time within such a range that the moving average value of the power consumption does not exceed PL1.

The performance control unit 217 may make PL1 variable between preset upper limit and lower limit of PL1 according to the changing trend of the power consumption of the processor. For example, when the difference between PL1 set at the time and the moving average value of the power consumption is equal to or less than a predetermined difference threshold value, the performance control unit 217 increases PL1. On the other hand, when the difference between the moving average value of the power consumption and PL1 set at the time is larger than the predetermined difference threshold value, the performance control unit 217 reduces PL1.

In the register of the CPU 11 or the system memory 21, a power control table is prestored. The power control table is control data configured to include a parameter set for each of N states of power control modes (where N is an integer of 2 or more). The parameter set of a power control mode at each stage includes ranges of PL1 (PL111 and PL131 in FIG. 5) and PL2 (PL112 and PL132 in FIG. 5). Each range of PL1 is represented by the lower limit and the upper limit, respectively. The range of PL1 of a power control mode at the n+1 stage (where n is an integer of 1 or more, and equal to or less than N−1) has only to be a range indicative of values larger than those in the range of PL1 of a power control mode at the n-th stage as a whole. Further, the range of PL1 of a power control mode at the n+1-th stage may be a range wider than the range of PL1 of the power control mode at the n-th stage. PL2 has only to be a value equal to or less than the upper limit of the power consumption on the specifications of the processor. Here, the stages n of the power control modes have only to be set in ascending order of PL1. Further, PL2 may be a value common among power control modes, or may be an independent value. The number of stages, N, of the power control modes may be common between processors, or may be an independent value.

The performance control unit 217 determines a power control mode for each processor according to the changing trend of the state of the processor. For the CPU 11, when an excess period as a period during which the power consumption of the CPU 11 continues to exceed a first reference power (hereinafter "SP11") becomes a predetermined first period (hereinafter "T11," for example, 5 to 10 seconds) or more, the performance control unit 217 changes the power control mode of the CPU 11 at the time from any stage of not less than the first stage and not more than the n-th stage to the n+1-th stage. SP11 has only to be a value lower, by a predetermined determination width (for example, 0.3 to 1[W]), than the lower limit of PL111 related to the power control mode of the CPU 11 at the n-th stage at the time.

When an intra-reference period as a period during which the power consumption of the CPU 11 continues to be equal to or less than a second reference power (hereinafter "SP12") becomes a predetermined second period (hereinafter "T12," for example, 5 to 30 seconds) or more, the performance control unit 217 changes the power control mode at the time from any stage of not less than the n+1-th stage and not more than the n-th stage to the n-th stage. SP12 has only to be a value lower, by the predetermined determination width (for example, 0.3 to 1[W]), than the lower limit of PL111 related to the power control mode of the CPU 11 at the n+1-th stage at the time. SP2 related to the power control mode at the n+1-th stage may be equal to or smaller than SP11 at the n+1-th stage. Further, SP12 related to the power control mode at the n+1 stage has only to be a value larger than SP12 at the n-th stage. Further, T12 may be equal to T11 or longer than T11. Setting SP12 smaller or setting T11 larger makes it more difficult to change the power control mode to a lower stage than to change the power control mode to a power control mode with larger PL111. This can prepare for an unexpected increase in power consumption.

For the GPU 13, when a duration to continue an operating state in which the GPU 13 is in operation becomes a predetermined third period (hereinafter "T31," for example, 5 to 12 seconds) or more, the performance control unit 217 changes the power control mode of the GPU 13 at the time from any stage of not less than the first stage and not more than the n-th stage to the n+1-th stage. For T31 related to a change to the power control mode at a higher stage, a longer duration is set. Thus, the longer the duration to continue the operating state in which the GPU 13 is in operation (running), the more sufficient throughput can be secured.

When a duration to continue a stopped state in which the GPU 13 is not in operation (not running) is a predetermined fourth period (hereinafter "T32," for example, 3 to 12 seconds) or more, the performance control unit 217 changes the power control mode of the GPU 13 at the time from either stage of not less than the n+1-th stage or the N stage at the time to the n-th stage. For T32 related to a change to the power control mode at a lower stage, a shorter duration may be set, or an equal duration may be set among power control modes that the GPU 13 can take. T32 at each individual stage may be equal to T31, or may be shorter than T31. Setting T32 shorter than T31 can prepare for unexpected continuation of the operating state or an unexpected increase in throughput.

Instead of or in addition to the duration for which the GPU 13 is in the operating state, the performance control unit 217 may also use temperature T of the GPU 13 to determine a power control mode of the GPU 13. Here, when a duration to continue a state in which the temperature T of the GPU 13 is a predetermined first temperature (hereinafter "TP31") or more exceeds T31, the performance control unit 217 changes the power control mode of the GPU 13 at the time from any stage of not less than the first stage and not more than the n-th stage at the time to the n+1-th stage. For TP31 related to a change to the power control mode at a higher stage, a higher temperature is set. As will be described later, since the higher the stage of the power control mode is, the more the heat dissipation by the cooling fan 73 increases, a transition to the power control mode at a higher stage can be made to promote more aggressive heat dissipation. On the other hand, when a duration to continue a state in which the temperature T of the GPU 13 is a predetermined second temperature (hereinafter "TP32") or less exceeds T32, the performance control unit 217 changes the power control mode of the GPU 13 at the time from any stage of less than the n+1-th stage and more than the N stage to the n-th stage. For TP32 related to a change to the power control mode at a lower stage, a lower temperature is set. T32 at each individual stage may be equal to TP31, or may be lower than TP31.

The performance control unit 217 performs control in such a manner that the power consumption of each processor does not exceed a value of PL1 in the power control mode that the processor takes at the time and does not exceed PL2 for a predetermined period of time or more. PL2 may be a value equal to or more than the largest value of PL1 for each of power control modes that the processor can take, or may be a value common among power control modes that the processor can take. Thus, even when PL1 related to the power control mode of the processor at the time is low, since PL2 equivalent to a power control mode with larger PL1 is set, a temporary rise of power consumption is allowed. Therefore, the performance of the processor can be temporarily demonstrated without changing the power control mode of the processor as long as the power consumption is continuously low.

In the following description, conditions for changing to the power control mode at the n+1-th stage with higher PL1 may be called upgrading conditions (rank up conditions). Parameters related to the upgrading conditions, that is, SP11 and T11 for the CPU 11, or T31 (or T31 and further TP31) for the GPU 13 may be called upgrading parameters. Further, conditions for changing to the power control mode at the n-th stage with lower PL1 may be called downgrading conditions (rank down conditions). Parameters related to the downgrading conditions, that is, SP12 and T12 for the CPU 11, or T32 (or T32 and further TP32) for the GPU 13 may be called downgrading parameters. Further, the upgrading conditions and the downgrading conditions may be collectively referred to as power-mode transition conditions or simply as mode transition conditions. Further, the upgrading parameters and the downgrading parameters may be collectively referred to as power-mode transition parameters or simply as mode transition parameters.

Therefore, in the register of the CPU 11 or the system memory 21, a mode transition table may be prestored separately from the power control table. The mode transition table is configured to include information indicative of the mode transition conditions or the mode transition parameters for each power control mode after being changed. More specifically, SP1, T11, SP2, and T12 for the CPU 11, and T31 and T32 (or T31, T32 and further TP31, TP32) for the GPU 13 may be included in the mode transition table. However, for the power control mode at the first stage with the lowest rated power PL1, SP2, T12, and T32 (or PL1, SP2, T12, T32, and further TP32) may not be set. For the power control mode at the n-th stage with the highest PL1, SP1, T11, and T31 (or SP1, T11, T31, and further TP31) may not be set.

The performance control unit 217 refers to the mode transition table to identify mode transition conditions for each processor to satisfy in order to change to a power control mode corresponding to the identified mode transition conditions. Note that when there are no mode transition conditions that the state of the processor at the time satisfies in the mode transition table (floating state (float)), the performance control unit 217 may maintain the power control mode of the processor at the time without making any change. An example of changes of power control modes will be described later.

Further, the performance control unit 217 may specify, as an initial value of the power control mode of the GPU 13, the same power control mode as a power control mode determined for the CPU 11. This is because the GPU 13 may not be working upon initial startup of the information processing apparatus 1. Further, each time the operation control mode of the CPU 11 is changed, the performance control unit 217 may specify the same power control mode as the changed operation control mode of the CPU 11 as a provisional value of the operation control mode of the GPU 13.

Note that the performance control unit 217 refers to the power control table to identify, for each processor, a range of PL1 and PL2 according to the power control mode at the time. The performance control unit 217 uses the identified range of PL1 and PL2 to determine the above-mentioned performance step for each processor. The performance control unit 217 outputs, to the drive control unit 403, power control mode information indicative of the determined power control mode. An example of power control modes will be described later.

Note that the performance control unit 217 may also use the temperature of the processor input from the temperature measuring unit 401 (to be described later) to control the processing power of the processor. For example, a control table indicative of performance step for each set of temperature and power consumption is preset in the register of the CPU 11. The performance control unit 217 identifies performance step corresponding to the temperature input for the CPU 11 and the power consumption indicated in the acquired processor state information. The performance control unit 217 sets the identified performance step in the register of the CPU 11. For the GPU 13, like for the CPU 11, the performance control unit 217 may identify performance step corresponding to the temperature of the GPU 13 and set the identified performance step in the register of the GPU 13.

Next, a configuration example of the power supply system 300 will be described. The power supply system 300 is configured to include the PD controller 41, the charger 43, and the DC/DC converter 45.

The PD controller 41 controls power supplied to the DC/DC converter 45 based on the processor state information input from the PM driver 213. The PD controller 41 adds consumed power due to the conversion of power by the DC/DC converter 45 or the like to the sum of power as the total value of power consumption required in each device to determine total power, and outputs, to the AD adapter 91, a power request signal indicative of the determined total power. The sum of power includes power consumption of each processor indicated in the operating state information.

The PD controller 41 may detect a charged state of the battery pack 47 (FIG. 1) to control charging from the charger 43 to the battery pack 47 based on the detected charged state. For example, when the electromotive force (battery voltage) of the battery pack 47 is a predetermined full-charge voltage or more, the PD controller 41 outputs, to the charger 43, charge control data indicative of a charge stop to stop charging to the charger 43. On the other hand, when the electromotive force of the battery pack 47 is less than the predetermined full-charge voltage, the PD controller 41 outputs, to the charger 43, charge control data indicative of execution of charging to cause the charger 43 to execute charging. The PD controller 41 may preset charge control data including a set value of the maximum charging current and a set value of the maximum charging voltage to the charger 43 to cause the charger 43 to perform charging with the maximum charging current or less and the maximum charging voltage or less instructed by these set values.

Note that the AD adapter 91 converts AC power, supplied to the own unit, to DC power. The AD adapter 91 supplies, to the information processing apparatus 1, DC power as the total amount of power indicated by the power request signal input from the PD controller 41. The information processing apparatus 1 and the AD adapter 91 are connected through a USB cable capable of transmitting various data, for example, according to the USB 3.2 standard. The USB cable has a signal line and a power line.

The charger 43 controls charging of power, supplied from the AD adapter 91 based on the charge control data input from the PD controller 41, to the battery pack 47. The charger 43 charges, to the battery pack 47, power remaining without being consumed out of the power supplied from the AD adapter 91.

The DC/DC converter 45 converts the voltage of power, supplied from the AD adapter 91, to a predetermined voltage required for the operation of each of devices that constitute the information processing apparatus 1, and supplies, to each device, power having the converted voltage. Note that when no power is supplied from the AD adapter 91, the DC/DC converter 45 converts power, supplied from the battery pack 47, to power as an input voltage, and supplies power of a predetermined voltage to each device.

Next, a configuration example of the temperature control system will be described. The temperature control system 400 is configured to include the temperature sensors 51 and 53, the temperature measuring unit 401, the drive control unit 403, a temperature control table 405, the drive circuit 77, and the cooling fan 73. The temperature measuring unit 401, the drive control unit 403, and the temperature control table 405 may be implemented as some of the functions of the EC 27, or may be implemented as some of the functions of the CPU 11.

Each of the temperature sensors 51 and 53 outputs, to the temperature measuring unit 401, a temperature signal indicative of a physical quantity (for example, thermo-electromotive force) related to the detected temperature. As mentioned above, the temperature sensors 51 and 53 can measure the surface temperatures of the CPU 11 and the GPU 13, respectively.

The temperature measuring unit 401 measures temperature corresponding to the physical quantity, indicated by the temperature signal input respectively from each of the temperature sensors 51 and 53, every predetermined time (for example, 0.1 to 5 seconds). The temperature measuring unit 401 outputs, to the drive control unit 403, temperature data indicative of the measured temperature, respectively.

The drive control unit 403 determines the operating state of the cooling fan based on the power control mode indicated by the power control mode information input from the performance control unit 217 and the temperature indicated by the temperature data input from the temperature measuring unit 401. The drive control unit 403 refers to the temperature control table 405 to determine an operating amount according to the power control mode and the temperature. However, the operating amount determined according to the power control mode for the CPU 11 and the temperature detected by the temperature sensor 51, and the operating amount determined according to the power control mode for the GPU 13 and the temperature detected by the temperature sensor 53 can be different from each other. Therefore, the drive control unit 403 determines one operating amount used to drive the cooling fan from a total of two operating amounts determined for the CPU 11 and the GPU 13, respectively. For example, the drive control unit 403 may adopt larger one of the two operating amounts, or may adopt an average value. The drive control unit 403 generates a drive control signal indicative of the determined operating amount, and outputs the generated drive control signal to the drive circuit 77.

The temperature control table 405 is configured to include, for each power control mode, one or more stages of sets of operating amounts and operating temperatures of the cooling fan 73. The operating temperature is temperature to instruct the cooling fan 73 to start operation in accordance with the operating amount corresponding to the operating temperature when the temperature detected by the temperature sensor 51, 53 is on the rise. When the temperature is on the rise in the power control mode at the time, and exceeds an operating temperature at a certain stage, the drive control unit 403 determines an operating amount corresponding to the operating temperature at the stage. On the other hand, when the temperature is on the drop in the power control mode at the time, and falls below an operating temperature at a certain stage by a predetermined decline (for example, 2 to 3[° C.]), the drive control unit 403 determines an operating amount corresponding to an operating temperature at a stage one step lower than the operating temperature at the stage. When there is no output corresponding to the operating temperature at the one-step lower stage, that is, when an operating amount at the 0-th stage is determined, the drive control unit 403 determines to stop, and outputs, to the drive circuit 77, a drive control signal indicative of the stop. An example of the temperature control table will be described later. One common temperature control table may be provided for temperatures respectively measured by the temperature sensors 51 and 53, or respectively separate temperature control tables may be provided. In the respectively separate temperature control tables, sets of operating amounts and operating temperatures different from each other may also be set.

The drive circuit 77 supplies, to the cooling fan 73, power corresponding to the operating amount indicated by the drive control signal input from the drive control unit 403. The amount of heat generation of the main system 100 depends mainly on the amounts of heat generation of the CPU and the GPU 13 among the electronic devices. The rotational speed of the cooling fan 73 is controlled based on the temperature T and the power control mode to dissipate heat according to the temperature rise due to heat generation.

Next, a data flow in voltage control according to one or more embodiments will be described.

Figure 3:
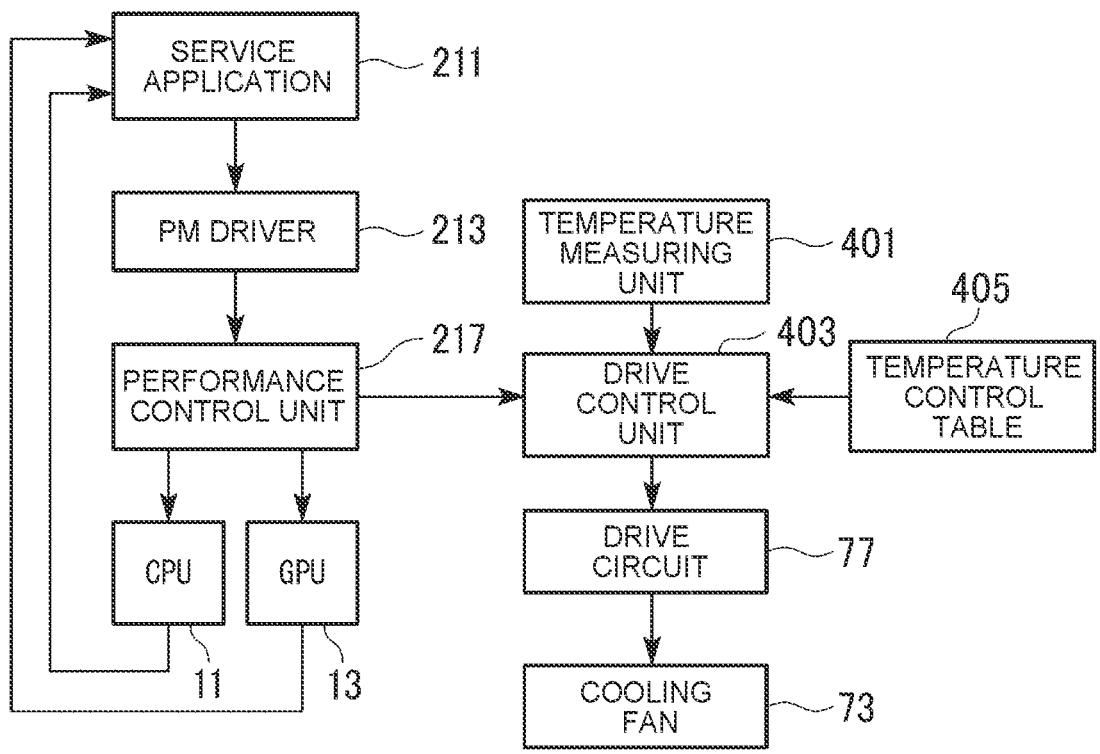
FIG. 3 is a schematic block diagram illustrating an example of a data flow in voltage control according to one or more embodiments.

FIG. 3 is a schematic block diagram illustrating an example of the data flow in voltage control according to one or more embodiments.

The service application 211 detects the respective states of the CPU 11 and the GPU 13, and outputs, to the PM driver 213, processor state information indicative of the detected states.

The PM driver 213 outputs, to the performance control unit 217, the processor state information input from the service application 211. The processor state information includes information related to the power consumption of the CPU 11 and the presence or absence of the operation of the GPU 13 or the temperature thereof.

Based on the processor state information input from the PM driver 213, the performance control unit 217 controls the processing power of the CPU 11 and the GPU 13.

Here, the performance control unit 217 determines respective power control modes of the CPU 11 and the GPU 13 according to the changing trends of respective power consumption of the CPU 11 and GPU 13. The settable range of PL1 varies depending on the power control mode. The performance control unit 217 sets, in the registers of the CPU 11 and the GPU 13, the ranges of PL1 and PL2 determined for the CPU 11 and the GPU 13, respectively. The CPU 11 and the GPU 13 control power consumption based on the ranges of PL1 and PL2 determined by the performance control unit 217, respectively.

The performance control unit 217 outputs, to the drive control unit 403, power control mode information indicative of the power control modes determined for the CPU 11 and the GPU 13, respectively.

The temperature measuring unit 401 outputs, to the drive control unit 403, temperature data indicative of temperatures respectively detected from physical quantities indicated by the temperature signals input from the temperature sensors 51 and 53, respectively.

The drive control unit 403 refers to the preset temperature control table 405 to determine the operating amount of the cooling fan 73 based on the power control modes notified from the performance control unit 217 and the temperatures indicated by the temperature data input from the temperature measuring unit 401. For example, when the operating amount based on the temperature detected by the temperature sensor 51 and the power control mode of the CPU 11 is different from the operating amount based on the temperature detected by the temperature sensor 53 and the power control mode of the GPU 13, the drive control unit 403 adopts larger one of the operating amounts.

The drive control unit 403 generates a drive control signal indicative of the determined operating amount, and outputs the generated drive control signal to the drive circuit 77.

The drive circuit 77 supplies, to the cooling fan 73, power corresponding to the operating amount indicated by the drive control signal input from the drive control unit 403.

The cooling fan 73 operates while consuming the power supplied from the drive circuit 77.

(Power Control Mode)

Figure 4:
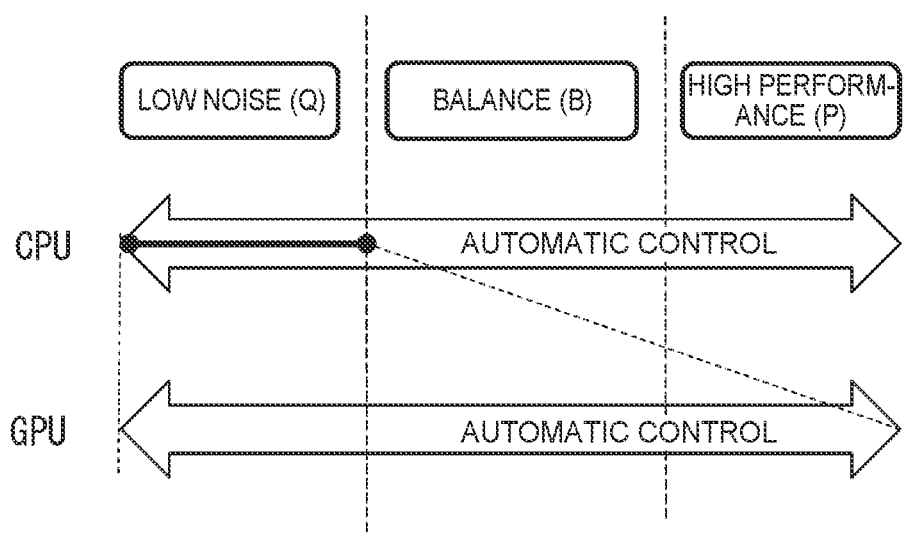
FIG. 4 is an explanatory diagram illustrating an example of power control modes according to one or more embodiments.

Next, an example of power control modes according to one or more embodiments will be described. FIG. 4 is an explanatory diagram illustrating the example of power control modes according to one or more embodiments. Three-stage power control modes illustrated in FIG. 4 are a low noise mode (Q: Quiet), a balance mode (B: Balance), and a high performance mode (P: Performance). Each power control mode is characterized by the surface temperature, the noise level, and the set power. In one or more embodiments, respective power control modes are automatically controlled according to the respective states of the CPU 11 and the GPU 13 as mentioned above. In the conventional, the power control mode of the CPU 11 and the power control mode of the GPU 13 are set equal to each other. For example, in the case of the low noise mode (Q), the power control mode of the GPU 13 has also been set to the low noise mode (Q) like that of the CPU 11. On the contrary, in one or more embodiments, even when the power control mode of the CPU 11 is the low noise mode (Q), the power control mode of the GPU 13 can be any of the low noise mode (Q), the balance mode (B), and the high performance mode (P). In a case where the load on the CPU 11 continues to be relatively light, the GPU 13 can demonstrate processing power even if the load on the GPU 13 is relatively heavy or the load fluctuation is large.

FIG. 5 is a diagram illustrating an example of the power control table according to one or more embodiments.

The low noise mode (Q) is a power control mode focusing on reduction in noise level caused by the operation of the cooling fan 73. As the noise level parameter, the noise upper limit is kept low as SND1 [dB]. Since the opportunity to make the cooling fan 73 work or the output of the cooling fan 73 is reduced, PL111 of the CPU 11 is so set that both upper limit PO111qu [W] and lower limit PO111ql [W] as set power parameters are kept lower than PL111 in the other power control modes. Therefore, the low noise mode (Q) is suitable when the processing power is relatively low or when quick response is not required. For example, the low noise mode (Q) is applied to relatively light processing, such as editing or browsing of a document by a document creation app, browsing of a web page by a browser, calling, and sending/receiving emails. PL131 of the GPU 13 is also so set that both upper limit PO131qu [W] and lower limit PO131ql [W] are kept lower than PL131 in the other power control modes. Note that PO111qu may also be set to a value equal to PO111ql. In this case, the fluctuation of PL111 is not allowed and fixed to a value of PO111qu or PO111ql. Similarly, PO131qu may also be set to a value equal to PO131ql.

The balance mode (B) is a power control mode focusing on the balance between the reduction in noise level and the fluctuation of processing power. The range of PL111 for the CPU 11 related to the balance mode (B) is so set that the upper limit is PO111bu [W] and the lower limit is PO111bl [W]. This range is in the middle of the range of PL111 related to the low noise mode (Q) and the range of PL111 related to the high performance mode (P). In other words, PO111pl≥PO111bu>PO111bl≥PO111qu. The range of PL131 for the GPU 13 related to the balance mode (B) is so set that the upper limit is PO131bu [W] and the lower limit is PO131bl [W]. This range is also PO131pl≥PO131bu>PO131bl≥PO131qu.

The noise upper limit related to the balance mode (B) is SND2 [dB] in the middle of the noise upper limit SND1 related to the low noise mode (Q) and the noise upper limit SND3 related to the high performance mode (P). Therefore, the balance mode (B) is suitable for processing that does not become excessive even though a moderate state of power consumption continues. For example, the balance mode (B) can be applied to open a large file, install an app, execute a security measures app, and execute a CAD app.

The high performance mode (P) is a power control mode for making full use of the processing power of each processor. PL111 for the CPU 11 related to the high performance mode (P) may be such that the lower limit is PO111pl [W], which is equal to or more than PL111 in the other power control modes, and the upper limit is PO111pu [W] which is a value equivalent to PO112 set in PL112. PL131 for the GPU 13 related to the high performance mode (P) may be such that the lower limit is PO131pl [W], which is equal to or more than PL131 in the other power control modes, and the upper limit is PO131pu [W] which is a value equivalent to PO132 set in PL132. Therefore, the ranges of PL111 and PL131 related to the high performance mode (P) become wider than the ranges of PL111 and PL131 related to the other power control modes, respectively.

Since the high performance mode (P) is selected when more processing power is required, noise due to the operation of the cooling fan 73 is allowed. The noise upper limit SND3 [dB] related to the high performance mode (P) is higher than the noise upper limits related to the other power control modes. Therefore, the high performance mode (P) is suitable when the power consumption is continuously high or when quick response is required. For example, the high performance mode (P) can be applied to video editing, a streaming of large volume of video, AR/VR simulation, and the like.

In the example illustrated in FIG. 5, target temperatures are indicated as TEM1[° C.], TEM2[° C.], and TEM3[° C.] in the low noise mode (Q), the balance mode (B), and the high performance mode (P), respectively. Here, the target temperatures have only to have the following relations: TEM1≤TEM2<TEM3. These temperatures are temperatures a user can tolerate even in contact with the surface of the chassis while using the information processing apparatus 1. Further, in the example illustrated in FIG. 5, PL112 and PL132 are PO112 and PO132, respectively, regardless of the power control mode. Thus, a temporary rise of power consumption is allowed even in any power control mode.

Next, an example of the mode transition table will be described. FIG. 6 is a diagram illustrating an example of the mode transition table according to one or more embodiments. The mode transition table illustrated in FIG. 6 is configured to include mode transition conditions for each power control mode of each processor.

In the mode transition table, sets of upgrading conditions of the CPU 11 and the upgrading conditions of the GPU 13 are arranged in descending order of PL1 in the power control mode after being changed, that is, arranged in the order of the high performance mode (P), the balance mode (B), and so on, and further sets of downgrading conditions of the CPU 11 and downgrading conditions of the GPU 13 are arranged in ascending order of PL1 in the power control mode after being changed, that is, arranged in the order of the low noise mode (Q), the balance mode (B), and so on. Each order of these mode transition conditions corresponds to the priority of mode transition conditions to be applied by the performance control unit 217 in a manner as will be described later.

The upgrading condition of the CPU 11 to the high performance mode (P) is that a duration for which the power consumption of the CPU 11 becomes SP113 or more is T113 or more. The upgrading condition of the GPU 13 to the high performance mode (P) is that a duration of an operating state (ON) in which the GPU 13 is in operation is T313 or more.

The upgrading condition of the CPU 11 to the balance mode (B) is that a duration for which the power consumption of the CPU 11 becomes SP112 or more is T112 or more. The upgrading condition of the GPU 13 to the balance mode (B) is a duration of the operating state (ON) in which the GPU 13 is in operation is T312 or more. Here, SP113 takes on a value larger than SP112. SP112 may be within the range of PL111 in the balance mode (B) of the CPU 11, or may be smaller than the lower limit of PL111. SP113 may be within the range of PL111 in the high performance mode (P) of the CPU 11, or may be smaller than the lower limit of PL111. T113 may be equal to T112, or may be larger than T112. Further, T313 may be equal to T312, or may be larger than T312.

The downgrading condition of the CPU 11 to the low noise mode (Q) is that a duration for which the power consumption of the CPU 11 becomes equal to or less than SP121 is T121 or more. The downgrading condition of the GPU 13 to the low noise mode (Q) is that a duration of a stopped state (OFF) in which the GPU 13 is not working is T321 or more.

The downgrading condition of the CPU 11 to the balance mode (B) is that a duration for which the power consumption of the CPU 11 becomes SP122 or less is T122 or more. The downgrading condition of the GPU 13 to the balance mode (B) is that a duration of the stopped state (OFF) in which the GPU 13 is not working is T322 or more. Here, SP121 takes on a value smaller than SP122. SP121 may be within the range of PL111 in the low noise mode (Q) of the CPU 11, or may be smaller than the lower limit of PL111. Further, SP121 may be equal to SP112, or may be larger than SP112. SP122 may be within the range of PL111 in the balance mode (B) of the CPU 11, or may be smaller than the lower limit of PL111. Further, SP122 may be equal to SP113, or may be larger than SP113. T121 may be equal to T122, or may be smaller than T122. T321 may be equal to T322, or may be smaller than T322.

Figures 7, 8:
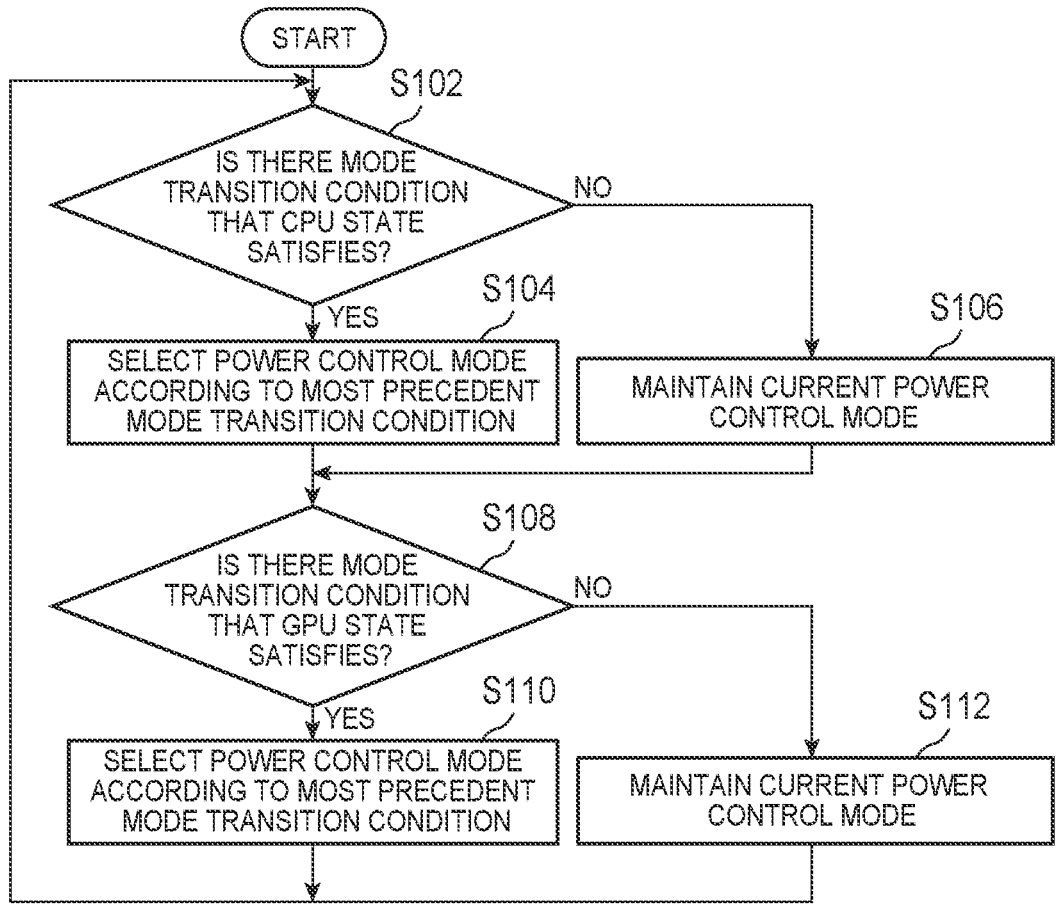
FIG. 7 is a diagram illustrating another example of the mode transition table according to one or more embodiments.
FIG. 8 is a flowchart illustrating an example of mode transition processing according to one or more embodiments.

FIG. 7 is a diagram illustrating another example of the mode transition table according to one or more embodiments. The mode transition table illustrated in FIG. includes, with respect to the CPU 11, mode transition conditions similar to the mode transition conditions illustrated in FIG. 6. On the other hand, with respect to the GPU 13, the mode transition table is configured to include a mode transition condition using the temperature of the GPU 13 as a parameter instead of whether to be the operating state or not (ON/OFF) as the state of the GPU 13. The upgrading condition of the GPU 13 to the high performance mode (P) is that a duration to continue a state in which the temperature is TP313 or more becomes T313 or more. The upgrading condition of the GPU 13 to the balance mode (B) is that a duration to continue a state in which the temperature is TP312 or more becomes T312 or more. TP313 is a temperature higher than TP312. TP313 may be equal to TEM3 (FIG. 5), or may be lower than TEM3. TP312 may be equal to TEM2 (FIG. 5), or may be lower than TEM2.

The downgrading condition of the GPU 13 to the low noise mode (Q) is that a duration to continue a state in which the temperature is TP321 or less becomes T321 or more. The downgrading condition of the GPU 13 to the balance mode (B) is that a duration to continue a state in which the temperature is TP322 or less becomes T322 or more. TP322 is a temperature higher than TP321. TP322 may be equal to TP313, or may be lower than TP313. TP321 may be equal to TP312, or may be lower than TP312.

As illustrated in FIG. 6 and FIG. 7, an upgrading condition to a power control mode higher in PL1 tends to be difficult to satisfy unless a high power consumption state of the CPU 11 continues. Further, the upgrading condition to the power control mode higher in PL1 tends to be difficult to satisfy unless the operating state or a high temperature state of the GPU 13 continues.

Therefore, when the state of the CPU 11 or the GPU 13 satisfies upgrading conditions to plural power control modes, the performance control unit 217 identifies an upgrading condition to a power control mode with the highest PL1 among the satisfied upgrading conditions, and gives priority to a transition to the power control mode according to the identified upgrading condition. This can immediately make a transition to a power control mode with PL1 as high as possible in such a phase that a continuously high power consumption state or the operating state continues.

On the other hand, a downgrading condition to a power control mode lower in PL1 tends to be difficult to satisfy unless a low power consumption state of the CPU 11 continues. Further, the downgrading condition to the power control mode lower in PL1 tends to be difficult to satisfy unless the stopped state or a low temperature state of the GPU 13 continues.

Therefore, when the state of the CPU 11 or the GPU 13 satisfies downgrading conditions to plural power control modes, the performance control unit 217 identifies a downgrading condition to a power control mode with the lowest PL1 among the satisfied downgrading conditions, and gives priority to a transition to the power control mode according to the identified downgrading condition. This can immediately make a transition to a power control mode with PL1 as low as possible in such a phase that a continuously low power consumption state or the stopped state continues.

Further, when the upgrading condition is prioritized over the downgrading condition, both of which are satisfied by the CPU 11 or the GPU 13, to prepare for unexpected continuation of the continuously high power consumption state or the operating state, necessary processing power can be demonstrated and heat dissipation can be promoted.

Referring next to FIG. 8, an example of mode transition processing will be described. FIG. 8 is a flowchart illustrating an example of mode transition processing according to one or more embodiments.

(Step S102) The performance control unit 217 refers to the mode transition table to determine whether the state of the CPU 11 satisfies respective mode transition conditions or not. When there is a mode transition condition(s) that the state of the CPU 11 satisfies (step S102: YES), the procedure proceeds to a process in step S104. When the state of the CPU 11 satisfies none of the mode transition conditions (step S102: NO), the procedure proceeds to a process in step S106.

(Step S104) The performance control unit 217 identifies the most precedent mode transition condition among the mode transition conditions that the state of the CPU 11 satisfies. The performance control unit 217 changes the power control mode of the CPU 11 to a power control mode according to the identified mode transition condition. After that, the procedure proceeds to a process in step S108.

(Step S106) The performance control unit 217 maintains the current power control mode of the CPU 11. After that, the procedure proceeds to a process in step S108.

(Step S108) The performance control unit 217 refers to the mode transition table to determine whether the state of the GPU 13 satisfies respective mode transition conditions or not.

When there is a mode transition condition(s) that the state of the GPU 13 satisfies (step S108: YES), the procedure proceeds to a process in step S110. When the state of the GPU 13 satisfies none of the mode transition conditions (step S108: NO), the procedure proceeds to a process in step S112.

(Step S110) The performance control unit 217 identifies the most precedent mode transition condition among the mode transition conditions that the state of the GPU 13 satisfies. The performance control unit 217 changes the power control mode of the GPU 13 to a power control mode according to the identified mode transition condition. After that, the procedure returns to the process in step S102.

(step S112) The performance control unit 217 maintains the power control mode of the GPU 13 at the time. After that, the procedure returns to the process in step S102.

Figures 9, 10:
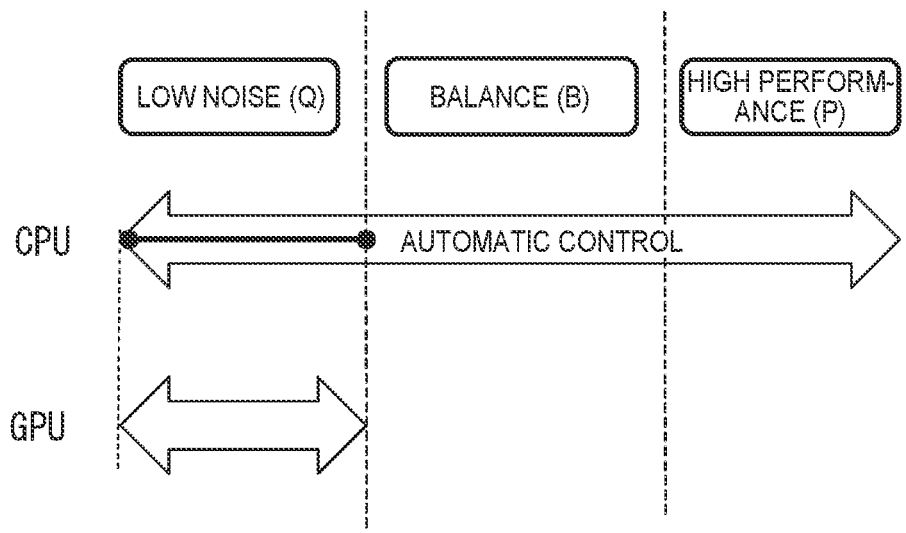
FIG. 9 is an explanatory diagram illustrating a control example of power control modes according to one or more embodiments.
FIG. 10 is an explanatory diagram illustrating a control example of conventional power control modes.

FIG. 9 is an explanatory diagram illustrating a control example of power control modes using the mode transition table illustrated in FIG. 6. Halftone dot meshing of mode transition conditions in "STATE" column of FIG. 9 indicates that the state of each processor satisfies the mode transition condition concerned. Here, since the state of the CPU 11 satisfies the downgrading condition to the low noise mode (Q) and the downgrading condition to the balance mode (B), the performance control unit 217 changes the power control mode of the CPU 11 to the low noise mode (Q) to which priority given over the other. Further, since the state of the GPU 13 satisfies the downgrading condition to the low noise mode (Q) and the downgrading condition to the balance mode (B), the performance control unit 217 changes the power control mode of the GPU 13 to the low noise mode (Q) to which priority is given over the other.

Note that when the state of the CPU 11 does not satisfy any of mode transition conditions (floating state), the performance control unit 217 maintains the mode transition condition at the time without any change. Further, when the state of the GPU 13 does not satisfy any of mode transition conditions, the performance control unit 217 maintains the mode transition condition at the time without any change.

In the transition of the power control mode of the CPU 11, the set of SP112 and T112, the set of SP121 and T121, or the like is used to evaluate whether the power consumption is continuously in a high state or not. As the continuously high power consumption state continues for a longer time, the performance control unit 217 can make a transition to a power control mode at a higher stage.

In the transition of the power control mode of the GPU 13, the duration T312 of the operating state, the duration T321 of the stopped state, or the like is used to evaluate whether the GPU 13 is continuously in the operating state or not. As the operating state continues for a longer time, the performance control unit 217 can make a transition to a power control mode at a higher stage.

In the transition of the power control mode of the GPU 13, the set of temperature TP312 and duration T312, the set of temperature TP321 and duration T321, or the like is used to evaluate whether the temperature is continuously in a high state or not. As the high temperature state continues for a longer time, the performance control unit 217 can make a transition to a power control mode at a higher stage.

Next, an example of the temperature control table will be described. The temperature control table is configured to include one or more stages of sets of outputs of the cooling fan 73 and operating temperatures for each power control mode. The higher the stage of the power control mode is, the more the number of stages of operating amounts as the outputs of the cooling fan 73 has only to be increased. For example, the numbers of stages are set to one, three, and five stages in the low noise mode (Q), the balance mode (B), and the high performance mode (P), respectively. In other words, the drive control unit 403 has only to be able to set the upper limit of the operating amount of the cooling fan 73 higher and the range of the operating amount wider as the stage of the power control mode is higher. Note that the operating amount is not limited to the noise level [dB] caused by the operation of the cooling fan 73, and the operating amount may be instructed by the rotational speed [rpm: round per minute] of the cooling fan 73 per unit time, or the power consumption [W] of the cooling fan 73.

As described above, the information processing apparatus according to one or more embodiments includes a first processor (for example, the CPU 11) which can take plural stages of first power control modes different in first rated power from one another, a second processor (for example, the GPU 13) which can take plural stages of second power control modes different in second rated power from one another, and a power control unit (for example, the performance control unit 217) which controls the power consumption of the first processor and the power consumption of the second processor. The power control unit determines a second power control mode based on a first event in which a predetermined state of the first processor continues for a first duration or more, and a second event in which a predetermined state of the second processor continues for a second duration or more.

According to this configuration, the second power control mode is determined by taking into account not only the first event in which the predetermined state of the first processor continues for the first duration or more, but also the second event in which the predetermined state of the second processor continues for the second duration or more. Even when the state of the second processor is continuously different from the state of the first processor, the function can be demonstrated by using the second power control mode determined according to the state of the second processor.

The power control unit may also determine a second power control mode higher in second rated power as the second duration to continue an operating state (for example, POWER ON) in which the second processor operates as the predetermined state of the second processor is longer.

According to this configuration, since the longer the period during which the second processor continuously operates, the higher the second rated power, high processing power can be continuously demonstrated.

The power control unit may further determine a second power control mode lower in second rated power as the second duration to continue a stopped state (OFF) in which the second processor is stopped as the predetermined state of the second processor is longer.

According to this configuration, since the longer the period during which the second processor is continuously stopped, the lower the second rated power, power consumption can be reduced in a case where a state of being unable to continuously demonstrate high processing power is allowed.

Further, the power control unit may determine a second power control mode higher in second rated power as the temperature of the second processor as the predetermined state of the second processor is higher. For example, as a condition to make a transition to the second power control mode higher in second rated power, the power control unit may determine whether a condition to continue a state, in which the temperature of the second processor becomes a predetermined temperature threshold value (for example, TP313, TP312) or more, for a predetermined duration (for example, T313, T312) or more is satisfied or not. The predetermined temperature threshold value is set smaller as the second rated power (for example, PL1) of a second power control mode as the transition destination is higher (for example, TP313>TP312).

According to this configuration, when the temperature of the second processor is continuously high, the transition to the second power control mode higher in second rated power can be made to promote heat dissipation and achieve higher processing power.

Further, the power control unit may determine the second power control mode higher in second rated power as the temperature of the second processor as the predetermined state of the second processor is higher.

According to this configuration, when the temperature of the second processor is continuously low, the transition to a second power control mode lower in second rated power can be made to avoid securing processing power higher than required in order to reduce power consumption. For example, as a condition to make a transition to the second power control mode lower in second rated power, the power control unit determines whether a condition to continue a state, in which the temperature of the second processor becomes a predetermined temperature threshold value (for example, TP321, TP322) or less for example, T321, T322), for a predetermined duration or more is satisfied or not. The predetermined temperature threshold value is set smaller as the second rated power (for example, PL1) of a second power control mode as the transition destination is lower (for example, TP321<TP322).

Further, the power control unit may give priority to the transition to a second power control mode with the highest rated power among transition destinations according to transition conditions that the state of the second processor satisfies as transition conditions (i.e., upgrading conditions) to a second power control mode higher in rated power.

According to this configuration, when the operating state of the second processor is continuously active or when the temperature continuously rises, the transition to a second power control mode related to higher rated power can be made more rapidly than when individual transition conditions are evaluated sequentially.

Further, the power control unit may give priority to the transition to a second power control mode with the lowest rated power among transition destinations according to transition conditions that the state of the second processor satisfies as transition conditions (i.e., downgrading conditions) to a second power control mode lower in rated power.

According to this configuration, when the operating state of the second processor is continuously inactive or when the temperature continuously drops, the transition to a second power control mode related to lower rated power can be made more rapidly than when individual transition conditions are evaluated sequentially.

Further, the power control unit may give priority to the transition to a transition destination according to a transition condition to a second power control mode higher in rated power over the transition to a transition destination according to a transition condition to a second power control mode lower in rated power among the transition conditions that the state of the second processor satisfies.

According to this configuration, since priority is given to the transition to a second power control mode higher in rated power over the transition of a second power control mode lower in rated power, the second processor can demonstrate the ability thereof when higher throughput is required.

The information processing apparatus may also include a temperature control unit (for example, the temperature control system 400) which controls the temperature of the own apparatus, wherein the temperature control unit expands the output range of a fan (for example, the cooling fan 73) of the own apparatus as the first rated power of the first power control mode is higher or as the second rated power of the second power control mode is higher.

According to this configuration, even when a significant fluctuation of processing power occurs in a power control mode higher in rated power, heat dissipation according to a fluctuation of the amount of heat generation can be achieved to suppress a rise in temperature.

Note that the various parameters related to the above processing are not limited to those mentioned above, and changes may be made according to various requirements, such as the processing power of each processor, the number of processors, and the size of the chassis. For example, the number of states of power control modes, the values of the upper limits of PL111 and PL131 at each stage, the lower limits of PL111 and PL131, the values of PL112, SP112, T112, SP121, and T121, the number of stages of outputs of the cooling fan 73, output at each stage, and operating temperatures may be different from those mentioned above. Further, when the values of SP112, SP121, and the like are values determined based on the upper limit of PL1 or the lower limit of PL1, the values may be omitted in the temperature control table. Further, when the values of T11, T12, T31, and T32 are constant values regardless of the power control mode, the values may be omitted in the temperature control table.

Further, the example in which the operating state or the stopped state of the GPU 13, and the temperature of the GPU 13 are used as transition conditions of the power control modes of the GPU 13 is described, but the power consumption of the GPU 13 may also be used instead of or in addition to these conditions. In this case, power consumption as an upgrading condition to a power control mode higher in PL131 has only to be increased. Further, power consumption as a downgrading condition to a power control mode lower in PL131 has only to be reduced.

Further, when determining the continuation of the state of each processor, the performance control unit 217 may also use a representative value representing a changing trend, such as a moving average value up to the time or a median, instead of the instantaneous value as the power consumption of the CPU 11, GPU 13. For example, the moving average value may be an exponentially weighted moving average, or a simple moving average value within a predetermined period (for example, 1 to 20[s]) up to time to pay attention (the attention time).

The above-mentioned parameters may be changeable according to an operation signal generated according to an operation accepted by the HID 31. The performance control unit 217 may determine a power control mode according to the operation signal input from the HID 31, or the determination of the power control mode determined according to the operation signal may be released. The drive control unit 403 controls the operation of the cooling fan 73 according to the power control mode determined by the performance control unit 217 in the manner mentioned above. For example, making the low noise mode (Q) selectable according to an operation can operate the information processing apparatus 1 in a manner suitable for a quiet environment, such as a library or a work room.

Further, the information processing apparatus 1 may include a video memory separately from the system memory 21. The video memory is used as a reading area of an execution program dedicated to the GPU 13 or a working area to which processing data (mainly display data) of the execution program of the GPU 13 is written. By providing the video memory separately from the system memory 21, reduced processing speed can be avoided even if the loads on both the CPU 11 and the GPU 13 increase. In this case, the system memory 21 may be shared with the GPU 13.

Further, in the above description, the example in which the information processing apparatus 1 includes one CPU and one GPU is mainly described, but one or more embodiments of the present invention is not limited to this example. The number of CPUs may be two or more, and the number of GPUs may be two or more. The performance control unit 217 has only to control the power control mode and power consumption according to the state of each processor.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 . . . information processing apparatus, 11 . . . CPU, 13 . . . GPU, 21 . . . system memory, 27 . . . EC, 31 . . . HID, 40 . . . power supply circuit, 41 . . . PD controller, 43 . . . charger, 45 . . . DC/DC converter, 47 . . . battery pack, 51, 53 . . . temperature sensor, 73 . . . cooling fan, 77 . . . drive circuit, 91 . . . AD adapter, 100 . . . main system, 101 . . . OS, 103 . . . schedule task, 200 . . . performance control system, 201 . . . state detection unit, 211 . . . service application, 213 . . . PM driver, 217 . . . performance control unit, 300 . . . power supply system, 400 . . . temperature control system, 401 . . . temperature measuring unit, 403 . . . drive control unit, 405 . . . temperature control table.

What is claimed is:

1. An information processing apparatus comprising:
    a first processor that takes plural stages of first power control modes different in first rated power from one another;
    a second processor that takes plural stages of second power control modes different in second rated power from one another; and
    a power control unit that controls power consumption of the first processor and power consumption of the second processor,
    wherein the power control unit determines a second power control mode based on a first event in which a predetermined state of the first processor continues for a first duration or more, and a second event in which a predetermined state of the second processor continues for a second duration or more.

2. The information processing apparatus according to claim 1, wherein the power control unit determines a second power control mode higher in second rated power as the second duration to continue an operating state in which the second processor operates as the predetermined state of the second processor is longer.

3. The information processing apparatus according to claim 1, wherein the power control unit determines a second power control mode lower in second rated power as the second duration to continue a stopped state in which the second processor is stopped as the predetermined state of the second processor is longer.

4. The information processing apparatus according to claim 1, wherein the power control unit determines a second power control mode higher in second rated power as temperature of the second processor as the predetermined state of the second processor is higher.

5. The information processing apparatus according claim 1, wherein the power control unit determines a second power control mode lower in second rated power as temperature of the second processor as the predetermined state of the second processor is lower.

6. The information processing apparatus according to claim 1, wherein the power control unit gives priority to transition to a second power control mode with highest rated power among transition destinations according to transition conditions as transition conditions to second power control modes higher in rated power that the state of the second processor satisfies.

7. The information processing apparatus according to claim 1, wherein the power control unit gives priority to transition to a second power control mode with lowest rated power among transition destinations according to transition conditions as transition conditions to second power control modes lower in rated power that the state of the second processor satisfies.

8. The information processing apparatus according to claim 6, wherein the power control unit gives priority to transition to a transition destination according to a transition condition to a second power control mode higher in rated power over transition to a transition destination according to a transition condition to a second power control mode lower in rated power among the transition conditions that the state of the second processor satisfies.

9. The information processing apparatus according to claim 1, further comprising:
    a temperature control unit that controls temperature of the information processing apparatus,
    wherein the temperature control unit expands an output range of a fan of the information processing apparatus as the first rated power of a first power control mode is higher or as the second rated power of a second power control mode is higher.

10. A control method of an information processing apparatus that includes:
    a first processor that takes plural stages of first power control modes different in first rated power from one another; and
    a second processor that takes plural stages of second power control modes different in second rated power from one another, the control method comprising:
    causing the information processing apparatus to determine a second power control mode based on a first event in which a predetermined state of the first processor continues for a first duration or more, and a second event in which a predetermined state of the second processor continues for a second duration or more.

* * * * *